(12) United States Patent
Zhao et al.

(10) Patent No.: US 8,804,872 B1
(45) Date of Patent: Aug. 12, 2014

(54) DYNAMIC DETERMINATION OF VOLTERRA KERNELS FOR DIGITAL PRE-DISTORTION

(71) Applicant: Texas Instruments Incorporated, Dallas, TX (US)

(72) Inventors: Hongzhi Zhao, San Jose, CA (US); Xiaohan Chen, Sunnyvale, CA (US); Xing Zhao, Los Altos, CA (US); David L. Brubaker, Los Altos, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/752,577

(22) Filed: Jan. 29, 2013

(51) Int. Cl.
*H04K 1/02* (2006.01)
*H04L 25/03* (2006.01)
*H04L 25/49* (2006.01)

(52) U.S. Cl.
USPC ........................................ 375/297

(58) Field of Classification Search
CPC ...................................... H03F 1/3247
See application file for complete search history.

(56) References Cited

U.S. PATENT DOCUMENTS

| | | | |
|---|---|---|---|
| 8,564,368 B1* | 10/2013 | Bai | 330/149 |
| 2010/0148865 A1* | 6/2010 | Borkar et al. | 330/149 |
| 2011/0080216 A1* | 4/2011 | Mujica et al. | 330/149 |
| 2013/0015917 A1* | 1/2013 | Ishikawa et al. | 330/149 |

\* cited by examiner

*Primary Examiner* — Erin File
(74) *Attorney, Agent, or Firm* — Robert D. Marshall, Jr.; W. James Brady; Frederick J. Telecky, Jr.

(57) ABSTRACT

A method of dynamically calculating and updating the Volterra kernels used by the Digital Pre Distortion engine based on output power, input signal bandwidth, multicarrier configuration, frequency response and power amplifier temperature. A dominant Volterra kernels searching DSP engine based on innovation bases with minimum RMS error selection is implemented to continuously update the Volterra kernels set used in DPD to model the power amplifier non linear behaviors.

4 Claims, 2 Drawing Sheets

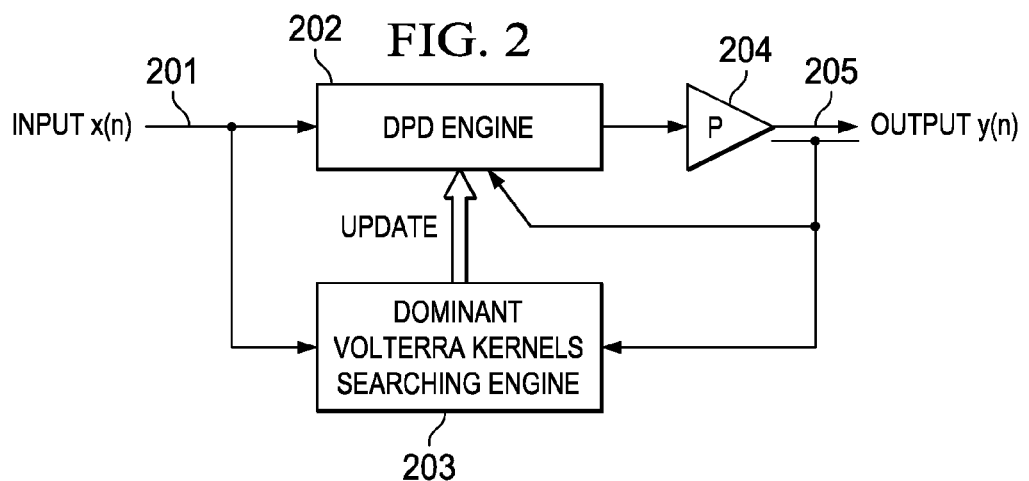
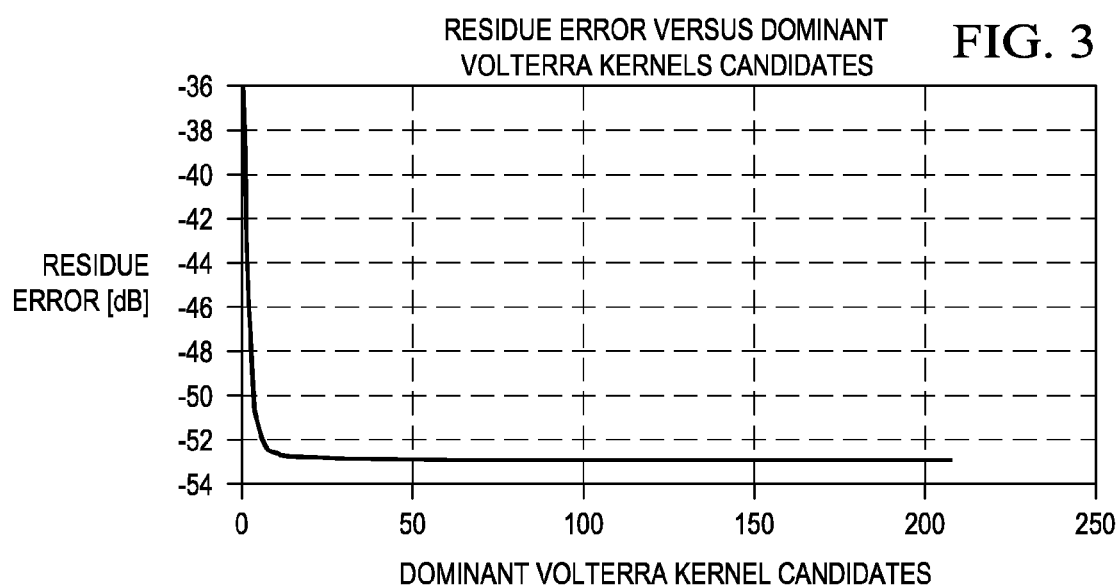

DYNAMIC DETERMINATION OF VOLTERRA KERNELS FOR DIGITAL PRE-DISTORTION

TECHNICAL FIELD OF THE INVENTION

The technical field of this invention is digital signal processing.

BACKGROUND OF THE INVENTION

Digital pre-distortion (DPD) is a technology to increase efficiency in RF power amplifiers and suppress frequency re-growth generated by power amplifier non-linear effects. This technology has been widely used in modern cellular network base station for GSM, CDMA, WCDMA and LTE standards. In order to increase the power amplifier efficiency the requirements for the memory taps and non-linear polynomial order for Volterra kernels based digital pre-distortion become more and more complicated. The digital computations increase exponentially with the number of Volterra Kernels. The adaption converge time has been significantly increased. The 3G cellular networks require very fast DPD converge time to handle the dynamic changes of modulation schemes, PA output power levels and multi-carrier configurations. The Volterra kernels are usually predetermined in the lab or in the manufacturing calibration stage, and usually there is a very large number to support all the modulation standards like CDMA, GSM, WCDMA and LTe, all of the multicarrier configurations and all power amplifier output power levels and power amplifier aging versus time changes. These predetermined Volterra kernels are usually not orthogonal and have significant correlations between each other.

DPD usually uses various adapt algorithms to calculate the coefficients of Volterra kernels. Volterra kernels are expressed in terms of some kinds of orthogonal polynomials in order to have a faster converging speed and better performance. Orthogonal polynomials add redundancy due to the higher order forms containing lower order forms. These factors significantly limit DPD performance.

SUMMARY OF THE INVENTION

The problem existing in the prior art can be significantly improved by using a structure/algorithm that dynamically determines the dominant Volterra Kernels for current operating PA output power level, RF modulation schemes, and carrier configurations.

An innovation kernels selection structure/algorithm based PA nonlinear system modeling using PA input and output data, minimum error and orthogonal process to select the minimum required kernels that can reach the best performance and fastest converge time for the current PA operating conditions.

BRIEF DESCRIPTION OF THE DRAWINGS

These and other aspects of this invention are illustrated in the drawings, in which:
FIG. 2 shows the pre-distortion system of the invention.
FIG. 3 is a graph illustrating the results of the invention.

DETAILED DESCRIPTION OF PREFERRED EMBODIMENTS

Figure 1:
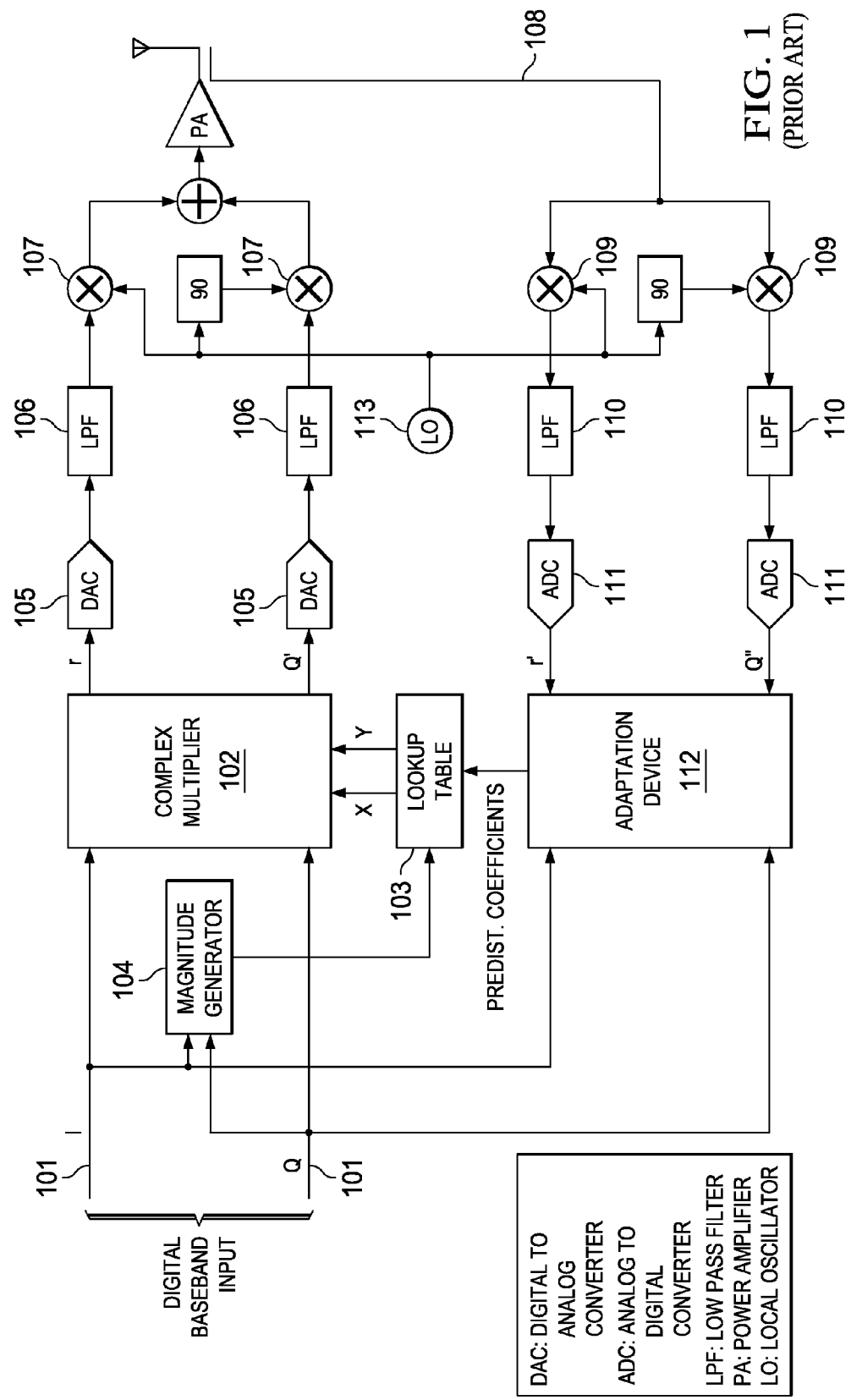
FIG. 1 shows a prior art digital pre-distortion system.

Distortion can be understood as a measure of the difference in shape between the input and output signals of a system. If the distortion does not generate additional signals at the output of the system, it is called linear distortion, and it can be reduced by using an equalizer. However, if the distortion is such that new signals (with new frequencies) appear at the output of the system, it is called non-linear distortion. This type of distortion is of concern because those additional signals may interfere with other communications systems.

Non-linear distortion was not much of a problem many years ago when communications systems utilized frequency modulation; this type of modulation does not introduce amplitude variations in the envelope of the signal being transmitted, for which power amplifiers could be operated in class-C, achieving high efficiencies.

Today's communication systems make use of spectrum-efficient modulations that have variable envelope. At the same time, the tendency is to use a single power amplifier for multi-carrier transmissions. In both cases, any amplitude or phase distortion of the signal as a function of its level will generate additional undesired signals called intermodulation distortion products (IMD).

The gain of a Radio Frequency (RF) power amplifier is typically not a constant at all output power levels. The magnitude of the gain decreases when the output power approaches the saturation level (which is the maximum achievable output power), and the phase of the gain could either increase or decrease, depending on the type of active device utilized by the power amplifier The major contribution to non-linear distortion occurs in the high power region. Hence, one method to minimize the non-linear distortion consists of the reduction of the input power in order to operate the power amplifier in its low power region. Unfortunately, the reduction of the output power, also called back-off, degrades the power efficiency. Low distortion and high efficiency go in opposite ways, and therefore a compromise solution is often found.

Many systematic methods of non-linear distortion reduction, often called linearization, have been developed. Among all methods, predistortion and feed-forward are the two that provide the best results.

Feed-forward linearization consists of the cancellation of the distortion products at the output of the power amplifier. To achieve this, a small portion of the input signal to the power amplifier is subtracted from a sample of the output of the power amplifier, obtaining in this way a third signal that only contains the distortion products of the amplifier. Then, the distortion signal is amplified by a low distortion auxiliary amplifier and subtracted from the output of the power amplifier, canceling out the distortion. Feed-forward linearization has been successfully employed in many communication systems, but it is difficult to add to existing amplifiers, and can only provide good results if the output back-off level of the power amplifier is in the order of 6 to 7 dB.

Predistortion linearization has been in use for many years as well, particularly in the satellite and microwave industries. A predistorter is a device that precedes a non-linear device such as an RF power amplifier. The magnitude of the predistorter gain increases when the magnitude of the power amplifier gain decreases, and the phase of the predistorter gain is the negative of the phase of the power amplifier gain. The net result is that the magnitude and phase of the gain of the two devices in cascade becomes approximately a constant until the power amplifier reaches saturation. Predistortion linearization can provide good results (50 dB of signal to IMD ratio) even at output power levels close to saturation.

Many practical analog predistorters have been developed for the satellite and microwave markets; in all cases, an analog, low level RF signal is applied to the input of the predistorter, and its output is connected to the power amplifier. Sometimes, digital controls are provided to set the predistorter operating parameters, but the signal processing is still entirely analog. Interestingly, most of the modern communications systems designed today use digital signal processing for the generation of the baseband signal. The availability of such a signal in digital format makes it possible to move the predistorter in the communications system chain from preceding the power amplifier to immediately after the baseband generation. This is desirable since a lower implementation cost and better performance could be possible.

In a digital predistorter, as shown in FIG. 1, the complex baseband digital signal 101 produced after the modulation takes place is used for the calculation of the signal magnitude 104. Each magnitude value is then used as the index in a look up table 103, where the coefficients of the predistorter gain have been previously stored. Finally, the complex signal is multiplied in 102 by the predistorter gain, and converted to an analog signal by two digital to analog converters 105, followed by reconstruction filters 106 to smooth out the signal and restrict its bandwidth.

A quadrature upconverter or modulator 107 is then used to shift the baseband signal to the radio frequency of operation. If the predistorter is designed to adjust itself automatically to cancel the non-linearity of the power amplifier, a feedback path 108 must be provided. This is accomplished by sampling the output of the power amplifier, downconverting the signal in 109 to baseband with the same local oscillator 113 used for the upconversion (to preserve the signal phase coherence), and converting the signal to digital with two analog to digital converters 111. Anti-alias filters 110 are necessary before the conversion to analog to prevent unwanted signals or noise from creating alias responses.

One method to determine the predistortion coefficients is to compare, in the time domain, the input and output waveforms of the power amplifier. The test signal must have such amplitude that its peak reaches the saturation point of the power amplifier in order to know its gain for the full signal excursion. The magnitude of the gain of the predistorter is calculated as the reciprocal of the magnitude of the power amplifier gain, and the phase of the gain of the predistorter is calculated as the negative of the phase of the power amplifier gain. In addition, the output of the power amplifier must become K times the input to the predistorter, where K is the net gain of the system.

Ideally, the non-linear behavior of an RF power amplifier should be the same for any type of signal and at all frequencies; this would be the case of a memoryless amplifier. Unfortunately, most RF power amplifiers have some degree of memory, for which their output will depend not only on the current input signal, but also its past. In other words, the output signal will be affected, i.e., by the frequency of the envelope of the signal, the frequency of the signal itself and temperature. Memory effects must be taken into account during the design of the predistorter if good performance is expected. Because the IMD cancellation is basically a sum of vectors of opposite phase and equal amplitude, memory effects will introduce small changes in those vectors that will degrade the cancellation of IMD products.

For the same reason stated above, any linear distortion in the signal path between the predistorter and the power amplifier will also affect the performance of the predistorter. Careful equalization is necessary to correct for linear distortions introduced by any of the components of the linearizer.

Digital pre-distortion (DPD) is a technology to suppress the spectrum re-growth at RF power amplifier (PA) output generated by its non-linear effects in order to increase power amplifier efficiency and reduce the cost of base stations or radio remote unit in modern cellular network. DPD usually uses various kinds of Volterra kernels with memory effects to model RF PA. Accurate PA model is a function of PA transistor type, its output power, and its input signal bandwidth. More accurate PA model will have better DPD performance. A PA is under-modeled if the selected Volterra kernels is a subset of the PA model. A PA is over-modeled if the PA model is a subset of the selected Volterra kernels. Under-model will limit DPD performance. Over-modeled will limit DPD converge speed and performance stability.

Modern cellular networks including 3G network need to provide high throughput data/voice service by deploying multi carrier GSM/EDGE, CDMA/EVDO and WCDMA/LTE standards with high peak-to-average (PAR) at PA input and dynamic changing PA output power, carrier configurations and modulation schemes. A high performance and fast converge DPD is required for a PA to work in a high efficiency and low cost mode.

An accurate Volterra kernels PA model for its current operating conditions (output power, carrier configuration, modulation scheme) is critical for a DPD to have best performance and fastest converge speed.

An accurate PA model usually is dependent on it output power, input signal bandwidth, multicarrier configuration and its impedance frequency response. It is also depend on the PA temperature. The PA temperature drifts versus it output power and the performance of temperature compensation circuits designed by PA vendors.

A dominant Volterra kernels searching DSP engine based on innovation bases with minimum rms error selection is implemented to continuously update the Volterra kernels set used in DPD to model the PA non-linear behavior. The continuously updated optimized Volterra kernels set will enable the DPD to provide the best performance with fastest converge speed.

As shown in FIG. 2, signal input 201 is connected to the Digital Predistortion engine 202 and to the dominant Volterra Kernels search engine 203. The output of DPD engine 202 is connected to power amplifier 204 generating output 205. A portion of output 205 is fed back to the Volterra search engine 203, and to the DPD engine 202. Search engine 203, based on the input and output characteristics of the signal continually updates the DPD engine 202 with the appropriate Volterra Kernel Set.

A PA output with non-linear behavior can be modeled using Volterra Kernel series:

$$y[n] = \sum_i w^i U^i(x[n])$$

where y[n] is PA output at sampling time n, x[n] is PA input at sampling time n, $U^i(x[n])$ is general Volterra kernel with memory effects. Usually a Volterra kernel can be expressed in various polynomial forms; $w^i$ is the corresponding coefficient.

The searching process starts with the dominant Volterra kernel $U^1(x[n])$, which is usually x[n]. Let x[n] be the 1st new build orthogonal base $e^1[n]=x[n]$. The residual error of using $e^1[n]$ to model y[n] is:

Step 1:

$$y\_error[n]^1 = y[n] - \frac{\langle y[n], e^1[n] \rangle}{\langle e^1[n], e^1[n] \rangle} e^1[n]$$

Then build an innovation base for each of the Volterra Kernels versus $e^1[n]$:
Step 2:

$$\{U^l(x[n])\}_{innovation} = U^l(x[n]) - \frac{\langle U^l(x[n]), e^1[N] \rangle}{\langle e^1[N], e^1[N] \rangle} e^1[N], l = 2, 3, 4 \ldots$$

Then calculate the residual error of using each innovation base and select the one with the minimum residual error as the new orthogonal base $e^2[n]$. The corresponding Volterra kernel is put into the candidate list for the next update of the Volterra kernels set for the DPD engine:
Step 3:

$$y\_error[n]_1^l =$$
$$y\_error[n]^1 \frac{\langle y\_error[n]^1, \{U^l(x[n])\}_{innovation} \rangle}{\langle \{U^l(x[n])\}_{innovation}, \{U^l(x[n])\}_{innovation} \rangle} \{U^l(x[n])\}_{innovation},$$
$$l = 2, 3, 4, 5 \ldots$$
$$e^2[n] = \{U^k(x[n])\}_{innovation}, k = \min(\langle y\_error[n]_1^l, y\_error[n]_1^l \rangle)$$
$$y\_error[n]^2 = y\_error[n]_1^k$$

Volterra Kernels Candidate={$U^1, U^k$}. $U^k$ is removed from search candidate list.

Continuing the step 1, step 2 and step 3 will generate new orthogonal base list and a dominant Volterra Kernel candidates list [$e^1, e^2, e^3 \ldots$], [$U^1, U^k \ldots$] (note: <x,y> denotes x and y cross-correlation.)

FIG. 3 shows the efficiency of this invention—out of 200 laboratory selected Volterra kernels, only 15 was needed to reach the required residual error.

What is claimed is:

1. A method of Digital Pre Distortion (DPD) comprising the steps of:
modeling the non linear behavior of a power amplifier by using Volterra Kernel series with memory effects:

$$y[n] = \sum_l w^l U^l(x[n])$$

where: y[n] is the power amplifier output at sampling time n, x[n] is PA input at sampling time n; $U^l(x[n])$ is general Volterra kernel with memory effects expressed in apolynomial form; and $w^l$ is a corresponding coefficient;

searching for the dominant Volterra Kernel with the minimum residue error by letting x[n] be the first new build orthogonal base $e^1[n]$=x[n]
Step 1, calculating a residual error of using $e^1[n]$ to model y[n] as follows:

$$y\_error[n]^1 = y[n] - \frac{\langle y[n], e^1[n] \rangle}{\langle e^1[n], e^1[n] \rangle} e^1[n]$$

where: <x,y> denotes x and y cross-correlation,
Step 2, building an innovation base for each of the Volterra Kernels versus $e^1(n)$ as follows:

$$\{U^l(x[n])\}_{innovation} = U^l(x[n]) - \frac{\langle U^l(x[n]), e^1[N] \rangle}{\langle e^1[N], e^1[N] \rangle} e^1[N], l = 2, 3, 4 \ldots$$

Step 3, calculating the residual error of using each innovation base and selecting an innovative base with the minimum residual error as the new orthogonal base $e^2[n]$, putting the corresponding Volterra kernel into a candidate list for the next update of the Volterra kernels set for the DPD engine as follows:

$$y\_error[n]_1^l =$$
$$y\_error[n]^1 - \frac{\langle y\_error[n]^1, \{U^l(x[n])\}_{innovation} \rangle}{\langle \{U^l(x[n])\}_{innovation}, \{U^l(x[n])\}_{innovation} \rangle} \{U^l(x[n])\}_{innovation},$$
$$l = 2, 3, 4, 5 \ldots$$
$$e^2[n] = \{U^k(x[n])\}_{innovation}, k = \min(\langle y\_error[n]_1^l, y\_error[n]_1^l \rangle)$$
$$y\_error[n]^2 = y\_error[n]_1^k$$

where: Volterra Kernels Candidate is {$U^1, U^k$} and $U^k$ is removed from search candidate list, and
repeating step 1, step 2 and step 3 to generate a new orthogonal base list [$e^1, e^2, e^3 \ldots$] and a dominant Volterra Kernel candidates list [$U^1, U^k \ldots$]; and
continuously updating the digital pre distortion process with the optimal Volterra Kernel set.

2. The method of claim 1 wherein:
the dominant Volterra Kernel set is dynamically determined for the current power amplifier output power level, radio frequency modulation method and carrier configuration.

3. The method of claim 1 wherein:
the dominant Volterra Kernel set with the lowest residue error is dynamically selected based on current power amplifier operating conditions.

4. The method of claim 1 wherein:
the smallest number of Volterra Kernels is dynamically selected that will result in the best performance and the fastest convergence time for the current power amplifier operating conditions.

* * * * *